(12) United States Patent
el Arculli

(10) Patent No.: US 10,717,335 B2
(45) Date of Patent: Jul. 21, 2020

(54) MOUNTING DEVICE WITH AN ANTI-ROTATION FEATURE

(71) Applicant: Toyota Motor North America, Inc., Plano, TX (US)

(72) Inventor: Mikhal el Arculli, Plano, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 88 days.

(21) Appl. No.: 15/953,358

(22) Filed: Apr. 13, 2018

(65) Prior Publication Data

US 2019/0315178 A1    Oct. 17, 2019

(51) Int. Cl.
*B60G 13/00* (2006.01)

(52) U.S. Cl.
CPC ...... *B60G 13/003* (2013.01); *B60G 2204/128* (2013.01); *B60G 2204/45021* (2013.01); *B60G 2206/70* (2013.01); *B60Y 2410/136* (2013.01)

(58) Field of Classification Search
CPC ............. B60G 13/003; B60G 2206/70; B60G 2204/128; B60G 2204/45021; B60Y 2410/136
See application file for complete search history.

(56) References Cited

U.S. PATENT DOCUMENTS

| | | | |
|---|---|---|---|
| 1,697,392 A * | 1/1929 | Lansing | F16F 7/04 267/206 |
| 4,781,502 A | 11/1988 | Kushnick | |
| 4,796,870 A * | 1/1989 | Hoffman | B60G 15/14 267/35 |
| 5,362,111 A | 11/1994 | Harbin | |
| 6,923,461 B2 * | 8/2005 | Momose | B60G 15/063 280/124.155 |
| 8,400,142 B2 | 3/2013 | Storrie | |
| 8,820,759 B1 * | 9/2014 | Croutcher | B62D 17/00 280/124.147 |
| 2007/0262554 A1 * | 11/2007 | Bromley | B62D 53/068 280/149.2 |
| 2009/0261542 A1 * | 10/2009 | McIntyre | B60G 17/021 280/6.157 |
| 2015/0091268 A1 * | 4/2015 | Croutcher | B60G 15/068 280/86.752 |
| 2015/0321531 A1 * | 11/2015 | Fox | B60G 15/067 280/124.155 |
| 2017/0158012 A1 * | 6/2017 | Hubert | F16C 27/08 |

* cited by examiner

*Primary Examiner* — Darlene P Condra
(74) *Attorney, Agent, or Firm* — Sheppard, Mullin, Richter & Hampton LLP; Hector A. Agdeppa; Daniel N. Yannuzzi

(57) ABSTRACT

A mounting device with an anti-rotation feature is provided. The mounting device includes a base including a cavity adapted to receive a portion of a shock absorber assembly. The base provides for movement of the shock absorber assembly relative to a vehicle body in at least one degree of freedom. The base substantially prevents movement of the shock absorber assembly relative to the vehicle body in at least another degree of freedom. The mounting device includes a pin integrated with the base on a side distal from the cavity. The pin is substantially parallel to an axis of the shock absorber assembly. The pin is adapted to engagingly couple to one or more cushions and a vehicle frame.

8 Claims, 7 Drawing Sheets

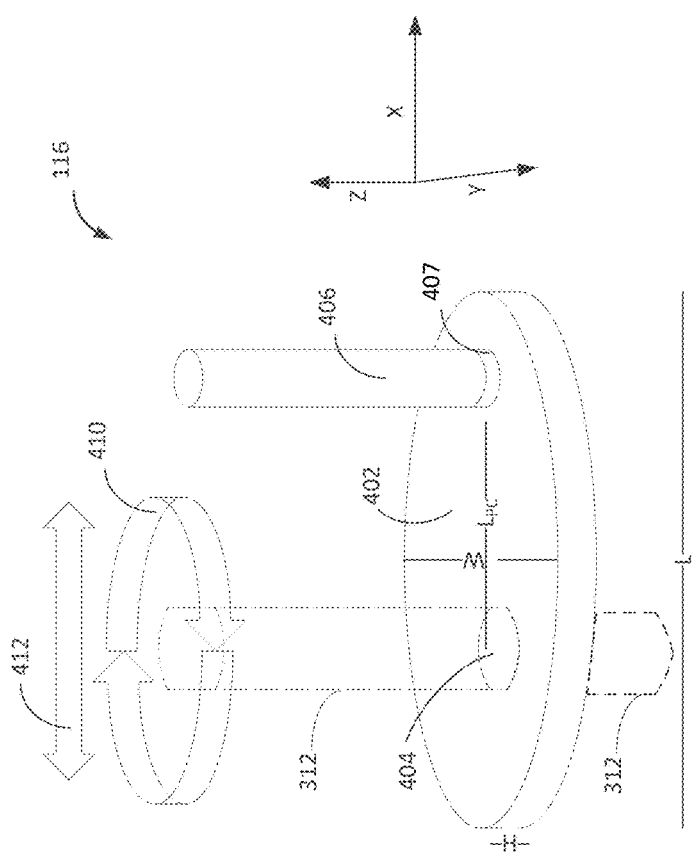
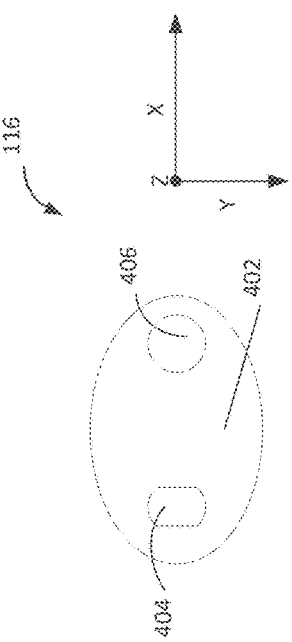
FIG. 4A
FIG. 4B

MOUNTING DEVICE WITH AN ANTI-ROTATION FEATURE

TECHNICAL FIELD

The disclosed technology relates generally to mounting devices, and more particularly, some embodiments relate to a mounting device with an anti-rotation feature.

DESCRIPTION OF THE RELATED ART

Shock absorbers are attached to a vehicle frame by cushions. The cushions are intended to help prevent unintentional rotation of a shock absorber to some degree. Some cushions achieve anti-rotation by way of a soft material that makes up part of a cavity in the cushion that receives the shock absorber. The soft material is often located between the cushions and the shock absorber to allow for freedom of movement of the shock absorber in a lateral and longitudinal direction. This undesirably causes freedom of movement in a rotational direction. This may create other undesirable movement of the shock absorber.

BRIEF SUMMARY OF EMBODIMENTS

In accordance with one embodiment, a mounting device includes a base. The base includes a cavity adapted to receive a portion of a shock absorber assembly. The base provides for movement of the shock absorber assembly relative to a vehicle body in at least one degree of freedom. The base substantially prevents movement of the shock absorber assembly relative to the vehicle body in at least another degree of freedom. The mounting device includes a pin integrated with the base on a side distal from the cavity. The pin is substantially parallel to an axis of the shock absorber assembly. The pin is adapted to engagingly couple to one or more cushions and a vehicle frame.

In some embodiments, the base includes a shape memory material, such that deformation of the base provides for movement of the shock absorber assembly in the at least one degree of freedom.

In some embodiments, the at least one degree of freedom includes a first set of directions substantially orthogonal to the axis of the shock absorber assembly.

In some embodiments, the at least another degree of freedom in which the movement of the shock absorber assembly is substantially prevented includes a second set of directions that are substantially rotational with regards to the axis of the shock absorber assembly.

In some embodiments, the at least another degree of freedom in which the movement of the shock absorber assembly is substantially prevented comprises a third set of directions substantially orthogonal to the axis of the shock absorber assembly and substantially orthogonal to the first set of directions.

In some embodiments, the pin is tapered, such that a first portion of the pin has a larger diameter than a second portion of the pin.

In accordance with another embodiment, a mounting device includes a base. The base includes a cavity adapted to receive a portion of a rotatable member. The base provides for movement of the rotatable member relative to a vehicle body in at least one degree of freedom. The base substantially prevents movement of the rotatable member relative to the vehicle body in at least another degree of freedom. The mounting device includes a pin integrated with the base on a side distal from the cavity. The pin is substantially parallel to an axis of the rotatable member. The pin is adapted to engagingly couple to one or more cushions and a vehicle frame.

In some embodiments, the base includes a shape memory material, such that deformation of the base provides for movement of the rotatable member in the at least one degree of freedom.

In some embodiments, the at least one degree of freedom includes a first set of directions substantially orthogonal to the axis of the rotatable member.

In some embodiments, the at least another degree of freedom in which the movement of the rotatable member is substantially prevented includes a second set of directions that are substantially rotational with regards to the axis of the rotatable member.

In some embodiments, the at least another degree of freedom in which the movement of the rotatable member is substantially prevented comprises a third set of directions substantially orthogonal to the axis of the rotatable member and substantially orthogonal to the first set of directions.

In some embodiments, the pin is tapered, such that a lower portion of the pin has a larger diameter than an upper portion of the pin.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4A illustrates a top view of a mounting device, in accordance with one embodiment of the present disclosure.

FIG. 4B illustrates a perspective view of a mounting device, in accordance with one embodiment of the present disclosure.

The figures are not intended to be exhaustive or limiting to the precise form disclosed. It should be understood that the disclosed technology can be practiced with modification and alteration, and that the disclosed technology be limited only by the claims and the equivalents thereof.

DETAILED DESCRIPTION OF THE EMBODIMENTS

Embodiments of the technology disclosed herein are directed to a mounting device with an anti-rotation feature. In some embodiments, the mounting device described herein may help mount an apparatus to a structure and substantially prevent the apparatus from rotating with respect to the structure, while nevertheless allowing the apparatus to move in one or more other directions with respect to the structure. The mounting device includes a base with a cavity adapted to receive the apparatus and a pin to help mount the apparatus to the structure. The base may be made of a shape memory material and shaped so the base may bend as a result of forces on the apparatus, allowing the apparatus to move in one or more directions. The pin may be made of a more rigid material, such that when the apparatus is coupled to the mounting device, and the apparatus and mounting device are coupled to the structure, the mounting device prevents rotation of the apparatus with respect to the structure and movement in at least another direction with respect to the structure. In some embodiments, the apparatus may be a shock absorbing device or apparatus (also referred to as a shock absorber), while the structure may be a vehicle frame.

Figure 1A:
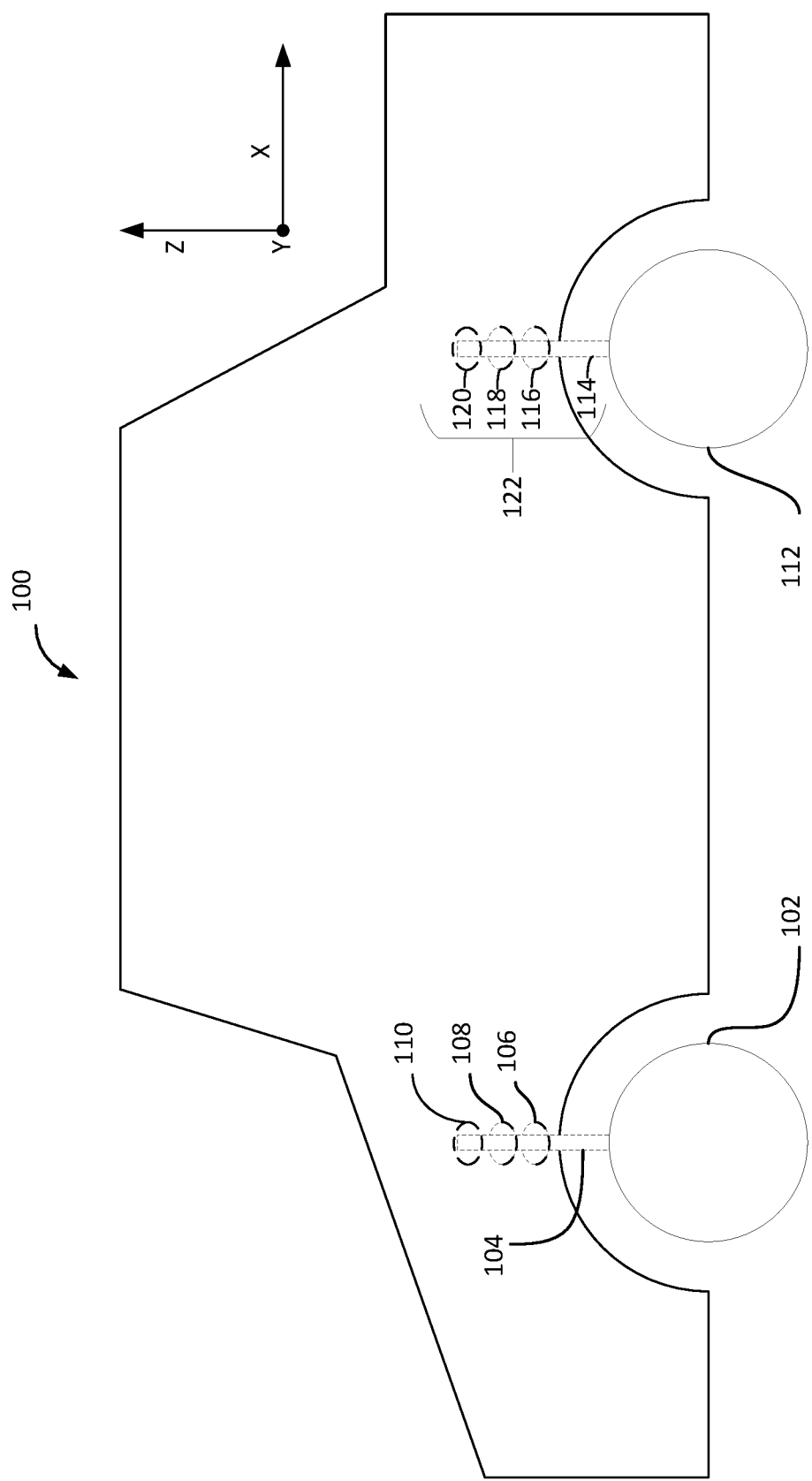
FIG. 1A illustrates a vehicle with which systems and methods for a mounting device can be implemented, in accordance with one embodiment of the present disclosure.

FIG. 1A illustrates an example of a vehicle 100 with which a mounting device 106, 116 can be implemented in accordance with one embodiment of the present disclosure. As illustrated in FIG. 1A, vehicle 100 is embodied as a car, but other vehicles may use mounting device 106, 116, such as a plane, bicycle, motorcycle, truck, van, or other type of vehicle. Moreover, use of mounting device 106, 116 described herein need not necessarily be limited to vehicles, but can be used in a system, apparatus, or other configuration having a shock absorption device connected thereto. Further still, mounting device 106, 116 may be used in conjunction with apparatuses other than a shock absorber assembly, for example a strut, engine tappets, or other rotatable apparatuses.

Vehicle 100 includes a suspension system 122. Suspension system 122, which may be incorporated individually with each tire 102, 112, includes an axle (not shown), shock absorber assembly 104, 114, mounting device 106, 116, and cushions 108, 110, 118 and 120. In particular, a lower portion of shock absorber assembly 104, 114 is coupled to an axle or otherwise near tire 102, 112. An upper portion of shock absorber assembly 104, 114 is coupled to mounting device 106, 116, and shock absorber assembly 104, 114 and mounting device 106, 116 are coupled to a lower cushion 108, 118, a vehicle frame cavity (not shown), and an upper cushion 110, 120. It can be understood that more than one suspension system may be used, and, in concert, the multiple suspension systems help absorb energy from bumps in roads and help dissipate that energy. The multiple suspension systems help ensure tires 102 and 112 are in contact with the road and help improve handling of vehicle 100, in addition to other features.

As would be understood by one of ordinary skill in the art, an axle transmits rotational force from an engine (not shown) to tires 102 and 112. Axles may be drive axles, dead axles, full-floating axles, etc. Drive axles are driven by the engine. Drive axles may include transaxles, split axles with differentials, live axles, etc. Dead axles may be free-rotating axles that are not driven by the engine of a vehicle and help support vehicle load. Full-floating axles are bolted to wheel hubs as a spindle and wheel bearing transfer the weight of the vehicle to an axle tube surrounding the axle shaft.

As part of suspension system 122, shock absorber assembly 114 helps absorb energy and dissipate that energy using oil, springs, gasses or other shock absorbing medium. Shock absorber assembly 114 improves road handling by ensuring tire 112 remains in contact with the road.

Figure 2A:
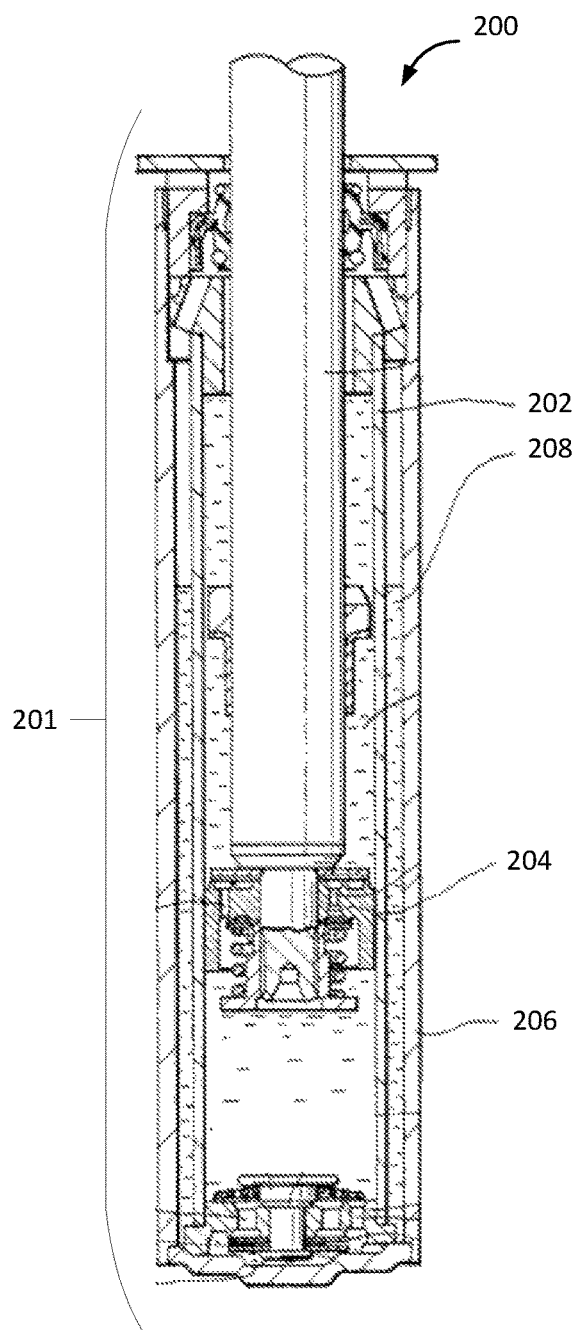
FIG. 2A illustrates a shock absorber assembly with which a mounting device can be implemented, in accordance with one embodiment of the present disclosure.

Different types of shock absorber assemblies may be used in vehicle 100. Examples of shock absorber assemblies include, but are not limited to, a twin-tube shock absorber assembly, a mono-tube shock absorber assembly, a shock absorber assembly with an external reservoir, internal/external bypass, spool valves, etc. Shock absorber assemblies have bodies including interworking cylinders and pistons. For example, referring to FIG. 2A, the body 201 of twin-tube shock absorber assembly 200 has an outer shell 206 and an inner cylinder 202. Inner cylinder 202 includes a piston 204 that moves in an axial direction with respect to inner cylinder 202. An upper portion of reservoir chamber 208 is filled with gas, and a lower portion of reservoir chamber 208 is filled with a damping liquid, such as oil. Piston 204 goes through compression cycles where outer shell 206 and inner cylinder 202 move toward each other.

Twin-tube shock absorber assembly 200 may be one embodiment of shock absorber assembly 114 of FIG. 1A. For example, referring back to FIG. 1A, tire 112 may be displaced vertically upward (relative to vehicle 100) as a result of bumps in the road which will vertically displace the axle along a z-axis. Displacement of the axle will in turn, compress twin-tube shock absorber assembly 200. Piston 204 goes through extension cycles where piston 204 is pulled upward as outer shell 206 and inner cylinder 202 move away from each other. Following the example above, in response to a compression cycle, the twin-tube shock absorber assembly 200 goes through an extension cycle.

Figure 1B:
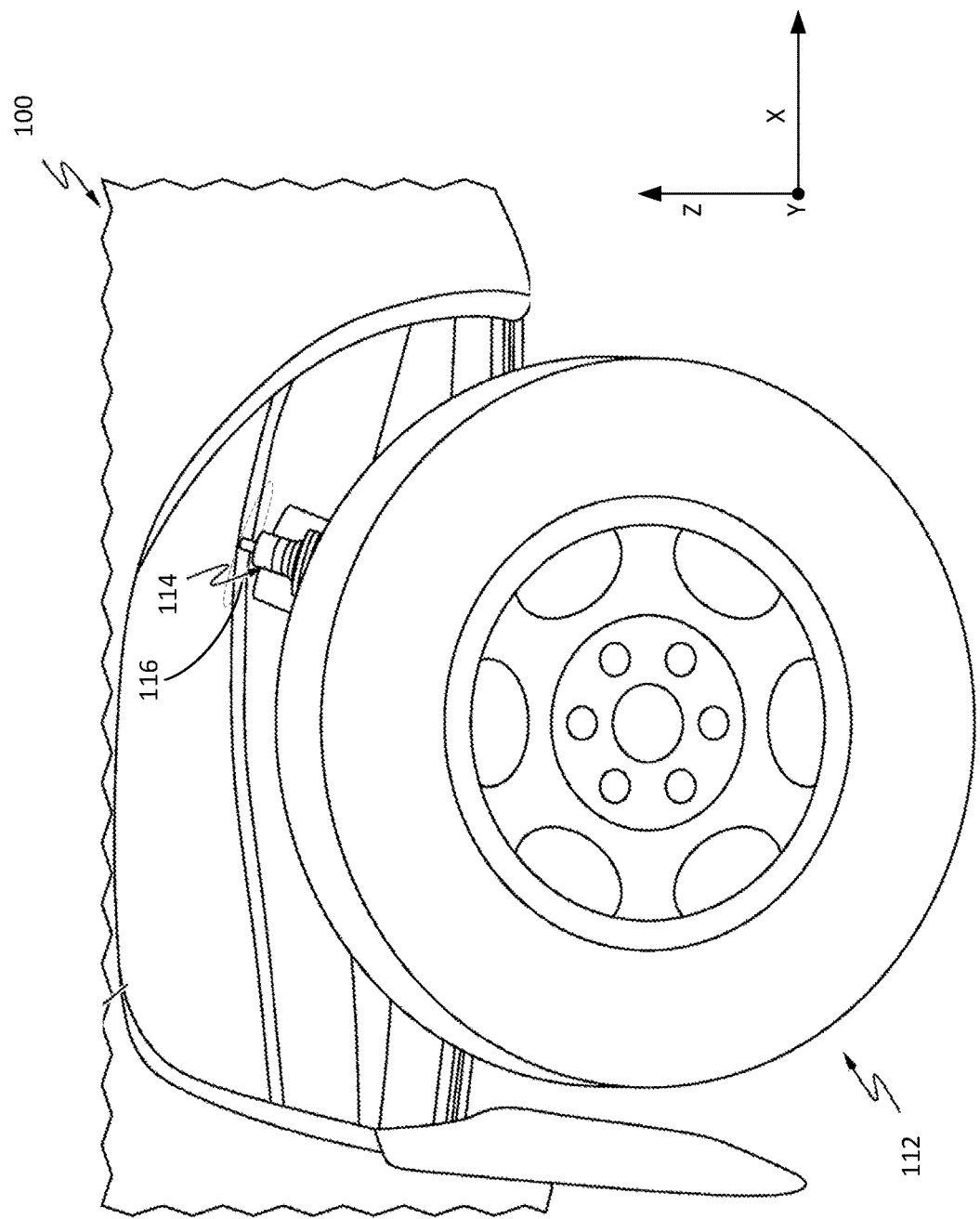
FIG. 1B illustrates a detailed side view of a tire of the vehicle of FIG. 1, in accordance with one embodiment of the present disclosure.
Figure 2B:
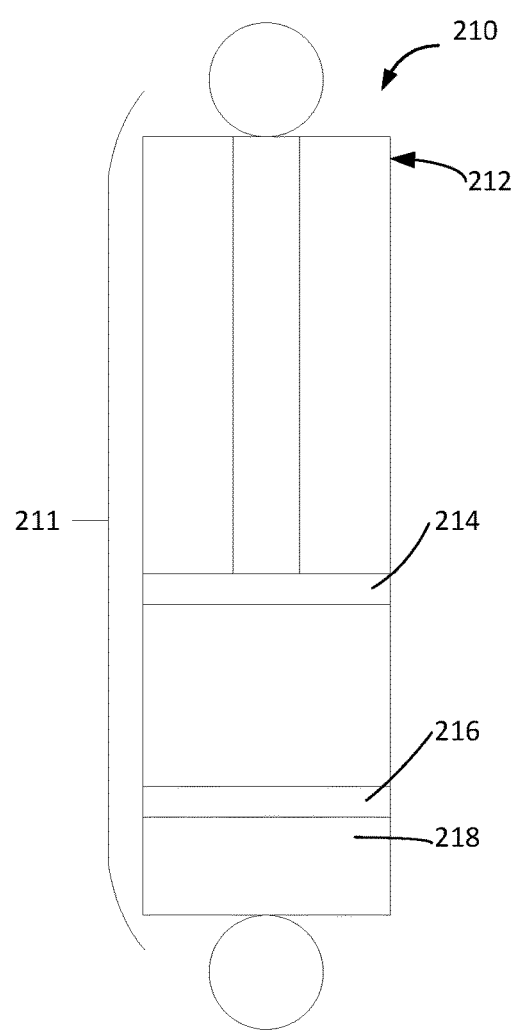
FIG. 2B illustrates a shock absorber assembly with which a mounting device can be implemented, in accordance with one embodiment of the present disclosure.

In one example, referring to FIG. 2B, a body 211 of mono-tube shock absorber assembly 210 includes a tube 212, working piston 214 and floating piston 216. Working piston 214, which is attached to the top of tube 212, pushes into and out of a fluid in response to displacement of tire 112 (FIGS. 1A and 1B) to which mono-tube shock absorber assembly 210 may be connected. Floating piston 216 separates the fluid from a pressurized gas reservoir 218. Floating piston 216 moves in response to working piston 214. Mono-tube shock absorber assembly 210 may be one embodiment of shock absorber assembly 114 of FIG. 1A. For example, referring back to FIG. 1A, tire 112 may be displaced vertically upward as a result of bumps in the road vertically displacing the axles (not shown). Returning to FIG. 2B, this vertical displacement results in compression of working piston 214 in mono-tube shock absorber assembly 210.

Figure 3:
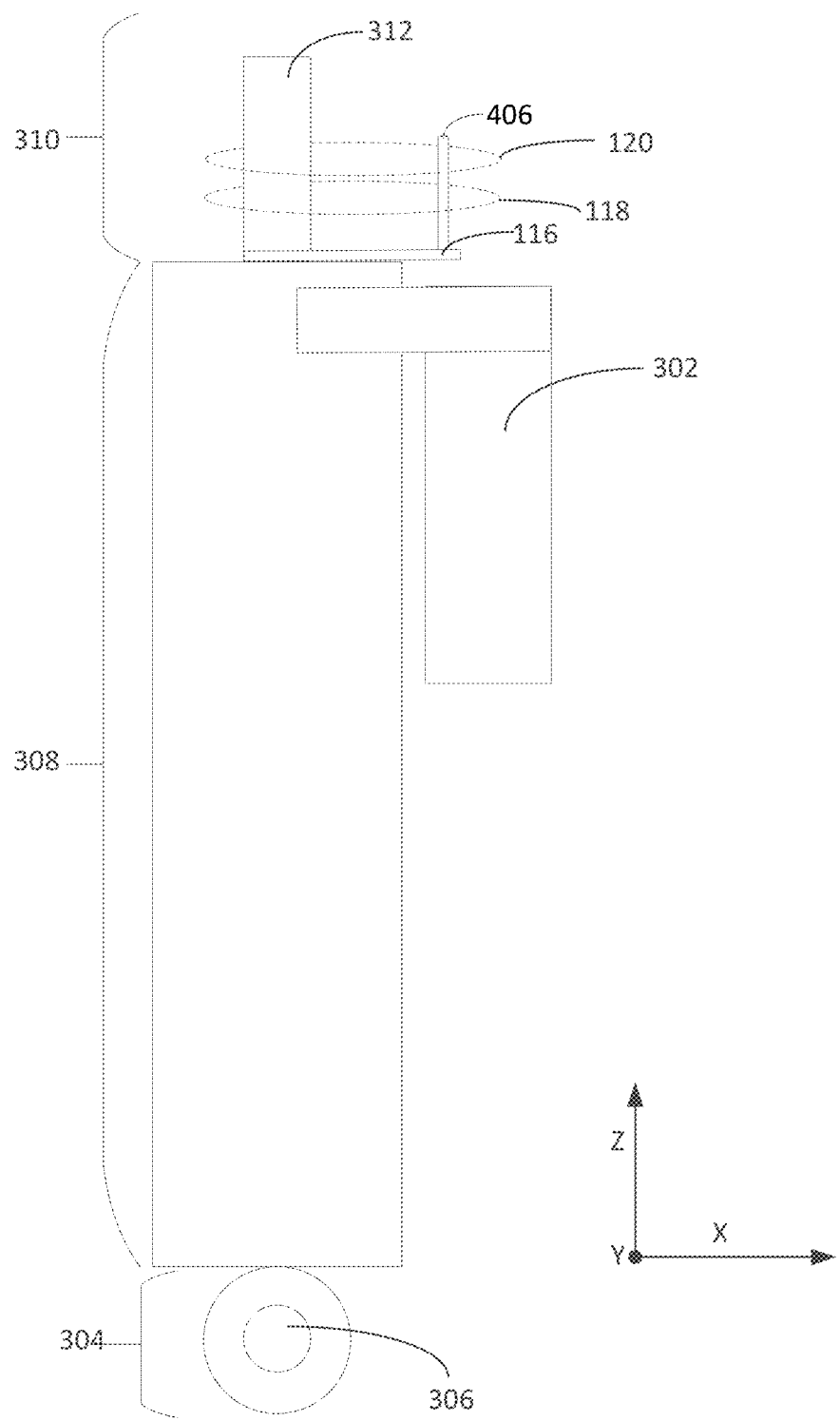
FIG. 3 illustrates a shock absorber assembly coupled to a mounting device and cushions, in accordance with one embodiment of the present disclosure.

In some embodiments, referring to FIG. 3, shock absorber assembly 114 has an external reservoir 302. As illustrated, external reservoir 302 is embodied as a piggyback type reservoir, but other external reservoirs may be used, such as in-line, remote, or other types of external reservoirs. External reservoir 302 includes extra fluid and may have a floating piston. External reservoirs help alleviate the problems associated with mono-tube or twin-tube shock absorbers. Over time, shock absorbers may generate heat from compression and extension cycles. The fluid in the shock absorber may start to foam, or aerate, which reduces the shock absorber's dampening ability. External reservoirs improve road handling and ride quality for longer by holding extra fluid so that the total fluid available for a shock absorber is kept cool and does not foam or aerate.

Referring back to FIG. 1A, in operation, shock absorber assembly 114 may be subject to various forces. Shock absorber assembly 114 may receive vertical forces from tire 112 being vertically displaced by uneven roads which in turn vertically displaces shock absorber assembly 114 via axles (not shown). Vertical forces may cause compression and extension cycles as described herein and cause axial motion along the z-axis.

Shock absorber assembly 114 may receive lateral forces from the turning of tire 112. Lateral forces may cause shock absorber assembly 114 to move in a lateral direction along the y-axis. Shock absorber assembly 114 may receive longitudinal forces from acceleration and deceleration of vehicle 100. Longitudinal forces may cause shock absorber assembly 114 to move in a longitudinal direction along the x-axis. Throughout the document, vertical, lateral, longitudinal, and rotational may be used to describe a direction or movement. Vertical generally refers to movement on the z-axis, lateral generally refers to movement on the y-axis, and longitudinal generally refers to movement on the x-axis, unless explicitly used otherwise. Rotational generally refers to rotation with respect to the z-axis, unless explicitly used otherwise.

Rotational forces may result from a combination of the vertical, the lateral, and/or the longitudinal forces. The rotational forces may cause shock absorber assembly 114 to rotate with respect to the z-axis. In some embodiments, the rotation will not significantly impact vehicle 100 or shock absorber assembly 114. In some embodiments, referring to FIG. 3, external reservoir 302 coupled to shock absorber assembly 114 may rotate and hit other parts of vehicle 100.

For example, referring to FIG. 16, shock absorber assembly 114 is relatively close to tire 112 along a y-axis. In some embodiments, shock absorber assembly 114 may have an external reservoir 302 (FIG. 3). Rotations of shock absorber assembly 114 may cause external reservoir 302 (FIG. 3) to hit tire 112, due, in part, to the bigger space the shock absorber assembly 114 occupies. Shock absorber assembly 114 hitting tire 112 may prevent shock absorber assembly 114 from performing efficiently, may damage shock absorber assembly 114, and may even present a danger to any passengers of vehicle 100. Contact between shock absorber assembly 114 (for example, external reservoir 302) and tire 112 may inhibit or prevent proper rotation of tire 112 during operation of vehicle 100.

Referring back to FIG. 3, shock absorber assembly 114 is illustrated as comprising a lower mount 304, a body 308, and an upper mount 310 being coupled to mounting device 116 and cushions 118 and 120, in accordance with one embodiment of the present disclosure. Lower mount 304 has a cavity 306 adapted to receive a bolt or other mechanism for securing shock absorber assembly 114 to an axle or otherwise near tire 112 (illustrated in FIG. 1B). Lower mount 304 may be substantially cylindrical, cuboid, pyramidal, etc., or a combination of shapes. Cavity 306 may be substantially cylindrical, cuboid, pyramidal, etc., or a combination of shapes. Lower mount 304 may be coupled to an axle (not shown) near tire 112 (illustrated in FIG. 1B) or otherwise coupled near tire 112.

Lower mount 304 is coupled to a lower portion of body 308. Body 308 may include the outer shell 206, inner cylinder 202, and piston 204 of twin-tube shock absorber assembly 200 (illustrated in FIG. 2A) or tube 212 and pistons 214 and 216 of mono-tube shock absorber assembly 210 (illustrated in FIG. 2B). Body 308 may include external reservoir 302 (illustrated in FIG. 3). Body 308 may be substantially cylindrical, cuboid, pyramidal, etc., or a combination of shapes.

Upper mount 310 includes a rod 312 in, and protruding from one end of, body 308. That is, rod 312 may be oriented co-axially with body 308. Rod 312 may be substantially cylindrical, cuboid, pyramidal, etc. or a combination of shapes. Rod 312 may be threaded or not threaded. Mounting device 116, lower cushion 118, and upper cushion 120 are adapted to receive rod 312. Rod 312 may couple with mounting device 116. Rod 312 and mounting device 116 couple to lower cushion 118, vehicle frame cavity (not shown), and upper cushion 120.

As illustrated in FIG. 3, mounting device 116 is adapted to receive rod 312 of upper mount 310 to lower cushion 118, vehicle frame cavity (not shown), and upper cushion 120. Mounting device 116 may be coupled to cushions 118 and 120 via pin 406 of mounting device 116 by cushions 118 and 120 encircling or surrounding rod 312 and pin 406. For example, pin 406 may pass through lower cushion 118, the vehicle frame cavity (not shown), and upper cushion 120.

Referring to FIGS. 4A and 4B, mounting device 116 may substantially prevent lateral movement of rod 312 with respect to the vehicle body along the y-axis. For example, rod 312 is substantially prevented from moving in a lateral direction along the y-axis. By virtue of preventing rod 312 from moving laterally along the y-axis, lateral movement of shock absorber assembly 114 (illustrated in FIG. 3) is prevented. Mounting device 116 may substantially prevent rotational movement of shock absorber assembly 114 (illustrated in FIG. 3) with respect to the z-axis. For example, rod 312 is substantially prevented from moving in a rotational direction, as illustrated by arrow 410 pointing clockwise. Rod 312 is also substantially prevented from rotating in a counter-clockwise direction. Preventing rotational movement of rod 312 substantially prevents rotational movement of shock absorber assembly 114 (illustrated in FIG. 3).

Base 402 may be substantially cylindrical, cuboid, pyramidal, etc. or a combination of shapes. For example, referring to FIG. 5A, a first end of base 402 may form a semi-circle surrounding a first portion (e.g., first half) of cavity 404. The end of the semi-circle may transition into straight sides that converge toward each other on a second end and form another semi-circular section surrounding at least a portion of pin 406. The shape of base 402 may help maintain structural integrity of mounting device 116. The first end of base 402 may be larger than the second end of base 402 to provide greater structure to support movement of rod 312 attached to shock absorber assembly 114 (FIG. 3) without base 402 shearing. The first end of base 402 may be smaller than the second end of base 402 to provide space for other components of vehicle 100 (illustrated in FIG. 1A). Pin 406 may be relatively stable and rigid such that less support from base 402 is required.

Referring back to FIG. 4A, base 402 is made of a shape memory material, such that base 402 is able to deform due to some applied force, and return substantially to its original shape. Shape memory material may include shape-memory polymers and shape memory alloys, such as spring steel, copper-aluminum-nickel, and nickel-titanium. In some embodiments, base 402 may be comprised of multiple shape memory materials. For example, depending on the amount of movement to be allowed in certain directions, different shape memory materials capable of providing the desired range of motion may be used. Moreover the dimensions of different areas of base 402 may be varied to achieve these different ranges of allowed movement.

Deformation of base 402 allows rod 312 to move in a longitudinal direction with respect to the vehicle body, as indicated by arrow 412. Thus, shock absorber assembly 114 (illustrated in FIG. 3) moves in a longitudinal direction along the x-axis. A portion of base 402 (e.g., a left side) may bend along a z-axis, such that shock absorber assembly 114 (illustrated in FIG. 3) moves in a longitudinal direction along the x axis.

In some embodiments, base 402 may have a height, H, of about 0.02 inch to about 1 inch. In some embodiments, base 402 may be taller to decrease the flexibility of base 402, thereby limiting an amount of longitudinal movement of rod 312 and shock absorber assembly 114 (illustrated in FIG. 3). Base 402 may be shorter to increase the flexibility of base 402, thereby increasing an amount of longitudinal movement of rod 312 and shock absorber assembly 114 (illustrated in FIG. 3). The height may be changed to affect durability of mounting device 116. Base 402 may have a second height adapted to receive pin 406 that is from about 0.01 inches to about 0.3 inches. The surface along the plane of height H of base 402 may be substantially flat. However, this surface may take other shapes, e.g., to accommodate different mounting positions or orientations, to avoid interacting or coming into contact with other elements or components of vehicle 100, etc.

In some embodiments, base 402 may have a range of different dimensions, such as length. In some embodiments, base 402 may have a total length, L, of about 1 inch to about 3 inches. Base 402 may have a longer total length L to increase the amount of longitudinal movement of rod 312, thereby increasing the longitudinal movement of shock absorber assembly 114 (illustrated in FIG. 3). Base 402 may have a shorter total length L to decrease an amount of longitudinal movement of rod 312, thereby decreasing the amount of longitudinal movement of shock absorber assembly 114 (illustrated in FIG. 3). Base 402 may have a second length, Lpc, describing the distance between the center of cavity 404 and center of pin 406. The second length, Lpc, may range from about 0.5 inches to about 2.5 inches. The surface along the plane of total length L of base 402 may be substantially flat. However, this surface may take other shapes, e.g., to accommodate different mounting positions or orientations, to avoid interacting or coming into contact with other elements or components of vehicle 100, etc.

In some embodiments, base 402 may have a range of total widths. In some embodiments, base 402 may have a total width, W, of about 0.5 inches to about 2 inches. Base 402 may have a wider total width W to increase the rigidity in at least one direction. Base 402 may have a smaller total width W to decrease the rigidity in at least one direction. The surface along the plane of total width W of base 402 may be substantially flat. However, this surface may take other shapes, e.g., to accommodate different mounting positions or orientations, to avoid interacting or coming into contact with other elements or components of vehicle 100, etc.

Base 402 may be coupled to rod 312. That is, base 402 is adapted to receive shock absorber assembly 114 (illustrated in FIG. 3) via cavity 404. Base 402 may use one or more set screws (not shown), or other mechanisms, to help stabilize mounting device 116 to shock absorber assembly 114 (illustrated in FIG. 3).

Cavity 404 is adapted to receive rod 312. Cavity 404 may be substantially circular, rectangular, triangular, etc., or any other combination of shapes. Rod 312 can directly contact base 402 when inserted into cavity 404, i.e., the inner surface of cavity 404. For example, cavity 404 may be shaped with straight sides and a curved top and bottom to receive a substantially similarly shaped rod 312 without any room for movement of road 312 inside of cavity 404.

Cavity 404 may have a range of dimensions. Cavity 404 continues through the height H of base 402. Cavity 404 may have a range of total widths from about 0.25 inches to about 1 inch. Cavity 404 may have a range of total lengths from about 0.25 inches to about 1 inch.

A center of cavity 404 may be a given length away from center of pin 406 ranging from about 1 inch to about 3 inches. The distance between cavity 404 and pin 406 allows for rod 312 to move longitudinally with respect to the vehicle body along the x-axis, as a result of vertical, lateral, and/or longitudinal forces exerted on rod 312. In turn, this causes shock absorber assembly 114 (illustrated in FIG. 3) to move longitudinally with respect to the vehicle body along the x-axis. A person having ordinary skill in the art may realize that the distances may be increased to allow for more movement in a longitudinal direction along the x-axis or decreased to allow for less movement in a longitudinal direction along the x-axis. Given a certain height of base 402, increasing the length between cavity 404 and pin 406 increases the flexibility of base 402, thus increasing the amount of movement of shock absorber assembly 114 (illustrated in FIG. 3) and vice versa.

As illustrated in FIG. 3, pin 406 couples with one or more cushions 118 and 120 and/or a vehicle frame. Pin 406 may be substantially cylindrical, cuboid, pyramidal, etc. or a combination of shapes. An axis of pin 406 is substantially orthogonal to the planar surface of base 402. The axis of pin 406 also runs along the z-axis, similar to the axis of rod 312 (FIG. 3). Pin 406 may be located on an opposite end of cavity 404, with respect to the x-axis, as described above. Pin 406 substantially prevents movement of rod 312, and thus, shock absorber assembly 114 (FIG. 3), in a rotational direction with respect to the z-axis and a lateral direction with respect to the vehicle body along the y-axis, when coupled to at least the vehicle frame.

Pin 406 may be coupled to base 402 by fully welding pin 406 to base 402 or by spot welding pin 406 to base 402. In embodiments, a fastener 407 may be used to attach pin 406 to base 402. For example, a bolt may be used to attach pin 406 to base 402. Pin 406 may be integrated into base 402, such that base 402 and pin 406 are fabricated from a single piece of metal. In some embodiments, a portion of pin 406 may extend into base 402 to help couple pin 406 to base 402. As will be understood by one having skill in the art, pin 406 may be otherwise coupled, attached, mounted, or integrated to base 402.

Pin 406 is made of a rigid material, such as carbon steel, steel, aluminum, an alloy, or other rigid material(s). In some embodiments, the rigid material may be galvanized, black zinc plated, chromate conversion coated, or otherwise finished. In other embodiments, base 402 and pin 406 may be machined out of a singular piece of shape memory material. In other embodiments, pin 406 may be attached to base 402 in a manner sufficient to provide the desired mounting strength and able to accommodate the above-described ranges of motion.

Pin 406 may have a range of total heights from about 0.5 inches to about 2 inches. Pin 406 may have a second height of about 0.25 inches to about 0.75 inches. Pin 406 may have a third height of about 1 inch. Pin 406 may have a fourth height of about 0.01 inches to about 0.2 inches. Pin 406 may have a second diameter of about 0.1 inches to about 0.25 inches. Pin 406 may have a third diameter of about 0.05 inches to about 0.4 inches. Pin 406 may have a first diameter extending through a second height of pin 406, and a second diameter extending from the end of the second height to a third height of pin 406. The first diameter of pin 406 may be substantially in contact with base 402. The first diameter may be larger than the second diameter. The second diameter may be about 60% of the first diameter. The first diameter may taper toward the second diameter. The second height of pin 406 may be about 25% of the total height of pin 406. The second height of pin 406 may provide space between lower cushion 118 and shock absorber assembly 114 (illustrated in FIG. 3). The third height of pin 406 may pass through lower cushion 118, the vehicle frame cavity adapted to receive rod 312 and mounting device 116, and upper cushion 120. In some embodiments, a third diameter of pin 406 extends below the first diameter to a fourth height to help couple pin 406 to base 402.

Pin 406 may have a tensile strength of about 20 to about 60 kilopounds per square inch (ksi). Pin strength may be determined based on durability, fit, and other concerns. One embodiment of pin 406 may be used for an all-terrain vehicle, and pin 406 may have a greater tensile strength. One embodiment of pin 406 may be used for a vehicle that mostly drives on paved roads, and pin 406 may have a lower tensile strength.

Referring back to FIG. 3, rod 312, and thus, shock absorber assembly 114 itself, is able to rotate with respect to the z-axis when not attached to mounting device 116. Rod 312, and thus, shock absorber assembly 114 itself, are substantially prevented from rotating with respect to a z-axis of mounting device 116 when coupled to mounting device 116. Rod 312, and thus, shock absorber assembly 114 itself, is substantially prevented from rotating with respect to the z-axis when rod 312 is coupled to mounting device 116 and vehicle frame. Rod 312, and thus, shock absorber assembly 114 itself, is substantially prevented from moving in a lateral direction along the y-axis with respect to the vehicle body when rod 312 is coupled to mounting device 116 and vehicle frame. Rod 312, and thus, shock absorber assembly 114 itself, is able to move with a longitudinal degree of freedom along the x-axis, as indicated by arrow 412 (illustrated in FIG. 4A), when coupled to mounting device 116 and vehicle frame via body 402 (illustrated in FIG. 4A).

Referring back to FIG. 3, lower cushion 118 has a first cavity adapted to receive shock absorber assembly 114, in particular, rod 312. Lower cushion 118 also has a second cavity adapted to receive mounting device 116, in particular pin 406. Lower cushion 118 includes flanges to help couple lower cushion 118 to the vehicle frame (not shown). In some embodiments, lower cushion 118 may have a range of total heights from about 0.5 inches to about 3 inches. In some embodiments, lower cushion 118 may have a range of total widths from about 0.5 inches to about 5 inches. In some embodiments, lower cushion 118 may have a range of total lengths from about 1 inch to about 6 inches. It can be understood that more than one cushion may be used. For example, a second cushion, e.g., upper cushion 120 may be used to provide cushioned engagement of shock absorber assembly 114 to vehicle frame (not shown). In some embodiments, the material(s), shape, and/or dimensions of upper cushion 120 may be substantially the same as that of lower cushion 118.

Lower cushion 118 may be used to couple rod 312 and mounting device 116 to a vehicle frame cavity (not shown) adapted to receive rod 312 and mounting device 116. Lower cushion 118 is attached to an attachment point on the underside of the vehicle frame cavity (not shown).

Upper cushion 120 may couple to vehicle frame cavity (not shown). Upper cushion 120 may help couple rod 312, mounting device 116, and lower cushion 118 to the vehicle frame (not shown). For example, rod 312 may pass through mounting device 116, lower cushion 118, a vehicle frame cavity (not shown), and upper cushion 120. Upper cushion 120 is attached to a top of the vehicle frame (not shown) via rod 312 and mounting device 116. Upper cushion 120 may include a securing mechanism, such as a nut, to help secure shock absorber assembly 114 to the vehicle frame. Cushions 118 and 120 may be other connecting points, such as a ball-joint connection, and/or other connectors.

Figure 5A:
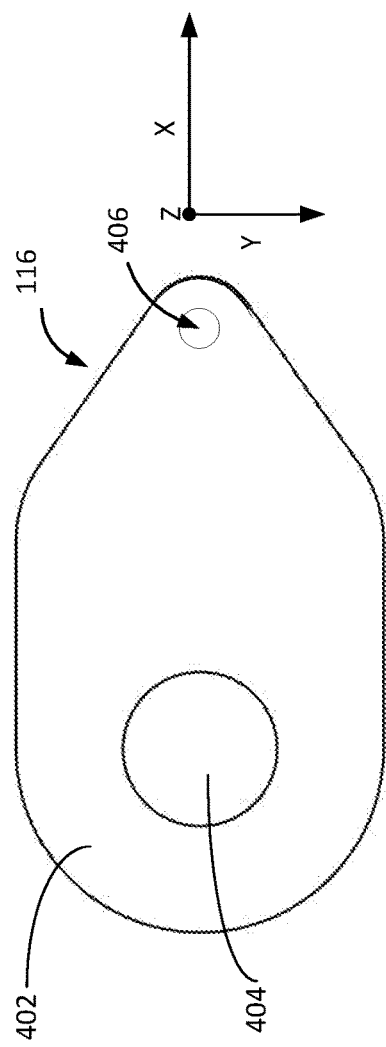
FIG. 5A illustrates a top view of a mounting device, in accordance with one embodiment of the present disclosure.
Figure 5B:
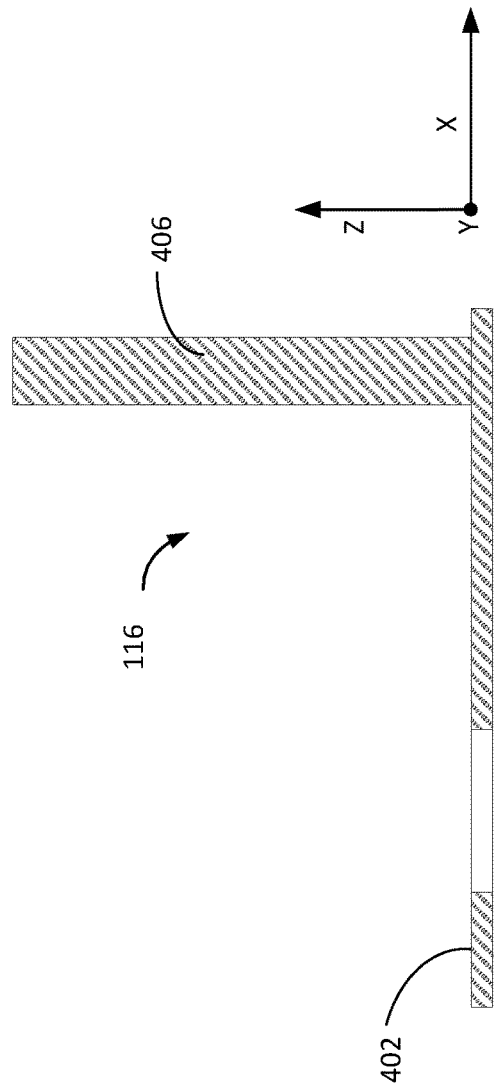
FIG. 5B illustrates a side view of a mounting device, in accordance with one embodiment of the present disclosure.

FIGS. 5A-5B illustrate top and side views, respectively, of mounting device 116 with an anti-rotation feature, in accordance with one embodiment. Referring to FIG. 5A, mounting device 116 includes cavity 404 and pin 406, both implemented in/on base 402. Mounting device 116 is adapted to receive rod 312 of upper mount 310 (illustrated in FIG. 3) and help couple shock absorber assembly 114 (illustrated in FIG. 3) to lower cushion 118 (illustrated in FIG. 3), vehicle frame cavity (not shown), and upper cushion 120 (illustrated in FIG. 3). Mounting device 116 may be coupled to cushions 118 and 120 (illustrated in FIG. 3) via pin 406 of mounting device 116. For example, pin 406 may pass through lower cushion 118 (illustrated in FIG. 3), the vehicle frame cavity (not shown), and upper cushion 120 illustrated in (FIG. 3).

Mounting device 116 may substantially prevent lateral movement of rod 312 (FIG. 3) with respect to the vehicle body along the y-axis. For example, rod 312 (illustrated in FIG. 3) is substantially prevented from moving in a lateral direction along the y-axis. By virtue of preventing rod 312 from moving laterally along the y-axis, lateral movement of shock absorber assembly 114 (illustrated in FIG. 3) is prevented along the y-axis. Mounting device 116 may substantially prevent rotational movement of shock absorber assembly 114 (illustrated in FIG. 3) with respect to the z-axis. For example, rod 312 (illustrated in FIG. 3) is substantially prevented from moving in a rotational direction with respect to the z-axis. Preventing rotational movement of rod 312 substantially prevents rotational movement of shock absorber assembly 114 (illustrated in FIG. 3) with respect to the z-axis.

Base 402 may be a combination of substantially cylindrical and cuboid shapes. In some embodiments, a first end of base 402 may form a semi-circle surrounding a first portion (e.g., first half) of cavity 404. The end of the semi-circle may transition into straight sides that converge toward each other at a second end and form another semi-circular section surrounding at least a portion of pin 406. The shape of base 402 may help maintain structural integrity of mounting device 116. The first end of base 402 may be larger than the second end of base 402 to provide greater structure to support movement of rod 312 (illustrated in FIG. 3) attached to shock absorber assembly 114 (illustrated in FIG. 3) without base 402 shearing. In some embodiments, the second end of base 402 may be smaller than the first end of base 402 to provide space for other components of vehicle 100

(illustrated in FIG. 1A). Pin 406 may be relatively stable and rigid such that less support from base 402 is required.

Base 402 may be made of a shape memory material allowing base 402 to bend along the z-axis. This may allow shock absorber assembly 114 (illustrated in FIG. 3) to move in a longitudinal direction along the x-axis. When mounting device 116 is coupled to shock absorber assembly 114 (illustrated in FIG. 3), the plane of base 402 may be perpendicular to the axis of shock absorber assembly 114 (illustrated in FIG. 3).

In some embodiments, base 402 is made of a shape memory material, such that base 402 is able to deform due to some applied force, and return substantially to its original shape. In some embodiments, shape memory material may include spring steel.

Deformation of base 402 allows rod 312 (illustrated in FIG. 3) to move in a longitudinal direction with respect to the vehicle body, as indicated by arrow 412. Thus, shock absorber assembly 114 (illustrated in FIG. 3) moves in a longitudinal direction along the x-axis. A portion of base 402 (e.g., a left side) may bend along a z-axis, such that shock absorber assembly 114 (illustrated in FIG. 3) moves in a longitudinal direction along the x axis.

In some embodiments, base 402 may have a total height of about 0.1 inches. In some embodiments, base 402 may have a total width of about 1.5 inches. In some embodiments, base 402 may have a total length of about 2 inches. In some embodiments, base 402 may have a length from the center of pin 406 to the center of cavity 404 of about 1.5 inches.

Base 402 may be coupled to rod 312 (illustrated in FIG. 3). That is, base 402 is adapted to receive shock absorber assembly 114 illustrated in (FIG. 3) via cavity 404. Base 402 may use one or more set screws (not shown), or other mechanisms, to help stabilize mounting device 116 to shock absorber assembly 114 (illustrated in FIG. 3).

Cavity 404 is adapted to receive rod 312 (illustrated in FIG. 3). In some embodiments, cavity 404 may be substantially circular or a combination of other shapes. Rod 312 (illustrated in FIG. 3) directly contacts base 402 when inserted into cavity 404, such that no material is between base 402 and rod 312 (illustrated in FIG. 3).

Cavity 404 may have a range of dimensions. In some embodiments, cavity 404 continues through the total height H of base 402. In some embodiments, cavity 404 may have a total width of about 0.25 inches. In some embodiments, cavity 404 may have a total length of about 0.25 inches.

In some embodiments, a center of cavity 404 may be about 1.5 inches away from a center of pin 406. The distance between cavity 404 and pin 406 allows for rod 312 (illustrated in FIG. 3) to move longitudinally with respect to the vehicle body along the x-axis, as a result of vertical, lateral, and/or longitudinal forces exerted on rod 312 (illustrated in FIG. 3). In turn, this causes shock absorber assembly 114 (illustrated in FIG. 3) to move longitudinally with respect to the vehicle body along the x-axis.

Pin 406 couples with one or more cushions 118 and 120 (illustrated in FIG. 3) and/or a vehicle frame (illustrated in FIG. 3). In some embodiments, pin 406 may be substantially cylindrical or pin 406 may comprise a combination of shapes. An axis of pin 406 is substantially orthogonal to the planar surface of base 402. The axis of pin 406 also runs along the z-axis, similar to the axis of rod 312 (illustrated in FIG. 3). Pin 406 substantially prevents movement of rod 312 (illustrated in FIG. 3), and thus, shock absorber assembly 114 (illustrated in FIG. 3), in a rotational direction with respect to the z-axis and a lateral direction with respect to the vehicle body along the y-axis, when coupled to at least the vehicle frame.

As previously described, pin 406 may be coupled, attached, mounted, or integrated to base 402 in various manners.

In some embodiments, pin 406 may be coupled to base 402 by fully welding pin 406 to base 402 or by spot welding pin 406 to base 402. A portion of pin 406 may extend into base 402 to help couple pin 406 to base 402.

Pin 406 is made of a rigid material, such as carbon steel or other rigid material(s). In some embodiments, the rigid material may be chromate conversion coated or otherwise finished.

In some embodiments, pin 406 may have a total height, wherein the total height may be separated into a second height, a third height. In some embodiments, pin 406 may include a fourth height. Pin 406 may have a total height of about 1.5 inches. Pin 406 may have a second height of about 0.4 inches, starting from a top of base 402 and ending at a start of the third height. Pin 406 may have a third height of about 1 inch, starting from a top of the second height and ending at a top of pin 406. In some embodiments, pin 406 may also have a fourth height of about 0.04 inches, starting at the bottom of pin 406 and ending at the start of the second height. In some embodiments, the second height of pin 406 may be about 25% of the total height of pin 406. The second height of pin 406 may provide space between lower cushion 118 (illustrated in FIG. 3) and shock absorber assembly 114 (illustrated in FIG. 3). The third height of pin 406 may pass through lower cushion 118 (illustrated in FIG. 3), the vehicle frame cavity adapted to receive rod 312 (illustrated in FIG. 3) and mounting device 116, and upper cushion 120 (illustrated in FIG. 3).

In some embodiments, pin 406 may have a first diameter of about 0.4 inches, extending throughout the second height of pin 406. Pin 406 may have a second diameter of about 0.25 inches, extending throughout the third height of pin 406. In some embodiments, pin 406 may have a third diameter of about 0.2 inches, extending throughout the fourth height of pin 406. In some embodiments, the first diameter may be larger than the second diameter. In some embodiments, the second diameter may be about 60% of the first diameter. The first diameter may taper toward the second diameter. In some embodiments, the third diameter of pin 406 helps couple pin 406 to base 402. As previously described, the tensile strength and the materials of pin 406 can vary.

Figure 5E:
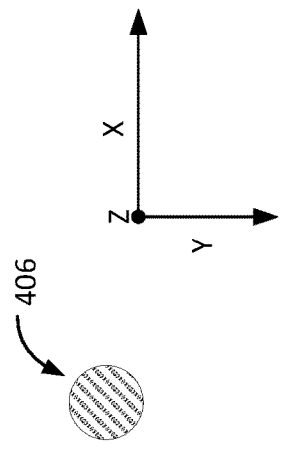
FIG. 5E illustrates a top view of a pin of a mounting device, in accordance with one embodiment of the present disclosure.
Figure 5F:
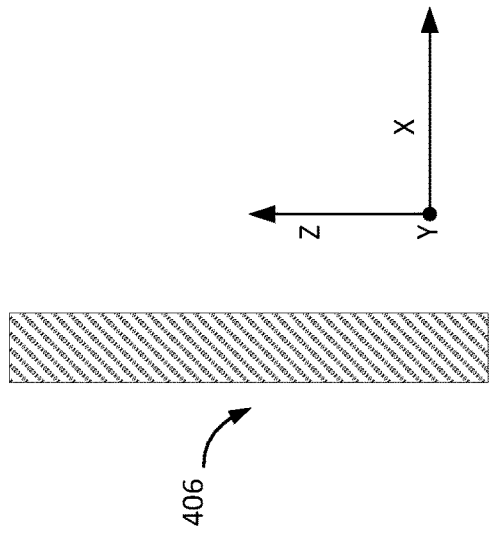
FIG. 5F illustrates a side view of a pin of a mounting device, in accordance with one embodiment of the present disclosure.
Figure 5C:
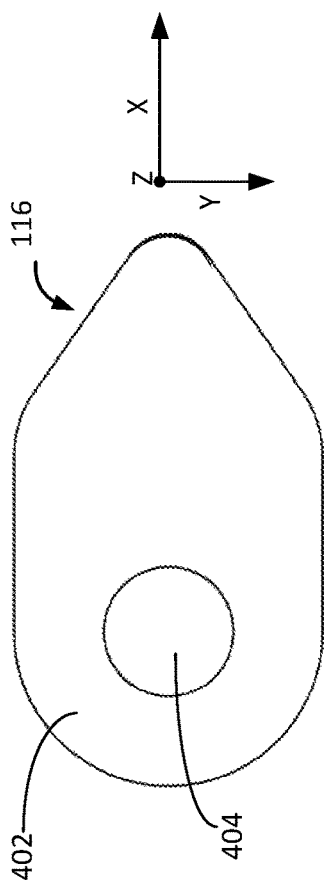
FIG. 5C illustrates a top view of a base of a mounting device, in accordance with one embodiment of the present disclosure.
Figure 5D:
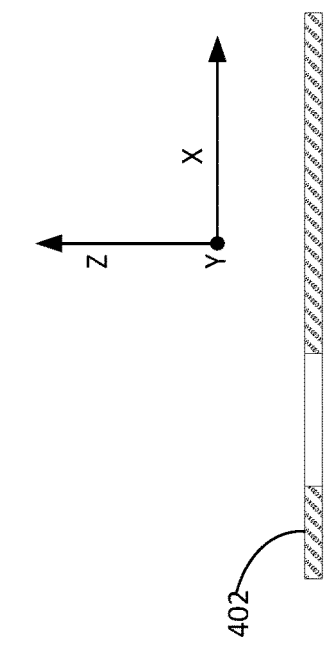
FIG. 5D illustrates a side view of a base of a mounting device, in accordance with one embodiment of the present disclosure.

FIGS. 5C and 5D illustrate top and side views, respectively, of base 402 of mounting device 116. Referring to FIG. 5C, Base 402 may be a combination of substantially cylindrical and cuboid shapes. In some embodiments, a first end of base 402 may form a semi-circle surrounding a first portion (e.g., first half) of cavity 404. The end of the semi-circle may transition into straight sides that converge toward each other on a second end and form another semi-circular section surrounding at least a portion of pin 406. The shape of base 402 may help maintain structural integrity of mounting device 116. The first end of base 402 may be larger than the second end of base 402 to provide greater structure to support movement of rod 312 (illustrated in FIG. 3) attached to shock absorber assembly 114 (illustrated in FIG. 3) without base 402 shearing. The second end of base 402 may be smaller than the first end of base 402 to provide space for other components of vehicle 100 (illustrated in FIG. 1A). Pin 406 may be relatively stable and rigid such that less support from base 402 is required.

Base 402 is made of a shape memory material, such that base 402 is able to deform due to some applied force, and return substantially to its original shape. In some embodiments, shape memory material may include spring steel.

In some embodiments, base 402 may be made of a shape memory material allowing base 402 to bend along the z-axis. This may allow shock absorber assembly 114 (illustrated in FIG. 3) to move in a longitudinal direction along the x-axis. When mounting device 116 is coupled to shock absorber assembly 114 (illustrated in FIG. 3), the plane of base 402 may be perpendicular to the axis of shock absorber assembly 114 (illustrated in FIG. 3).

Deformation of base 402 allows rod 312 (illustrated in FIG. 3) to move in a longitudinal direction with respect to the vehicle body, as indicated by arrow 412. Thus, shock absorber assembly 114 (illustrated in FIG. 3) moves in a longitudinal direction along the x-axis. A portion of base 402 (e.g., a left side) may bend along a z-axis, such that shock absorber assembly 114 (illustrated in FIG. 3) moves in a longitudinal direction along the x axis.

As described above, base 402 can be various shapes and sizes and cavity 404 may be in various locations on base 402.

Base 402 may be coupled to rod 312 (illustrated in FIG. 3). That is, base 402 is adapted to receive shock absorber assembly 114 (illustrated in FIG. 3) via cavity 404. Base 402 may use one or more set screws (not shown), or other mechanisms, to help stabilize mounting device 116 to shock absorber assembly 114 (illustrated in FIG. 3).

Cavity 404 is adapted to receive rod 312 (illustrated in FIG. 3). Cavity 404 may be substantially circular or it may comprise a combination of shapes, circular or other. Unlike conventional mounts, no cushioning material is used between a shock absorber rod and the mount. That is, the outer surface of rod 312 (illustrated in FIG. 3) directly contacts the inner surface of cavity 404.

As previously described, cavity 404 may have a range of dimensions and be located on different locations on base 402. The distance between cavity 404 and pin 406 allows for rod 312 (illustrated in FIG. 3) to move longitudinally with respect to the vehicle body along the x-axis, as a result of vertical, lateral, and/or longitudinal forces exerted on rod 312 (illustrated in FIG. 3). In turn, this causes shock absorber assembly 114 (illustrated in FIG. 3) to move longitudinally with respect to the vehicle body along the x-axis.

FIGS. 5E and 5F illustrate top and side views, respectively, of a pin 406 of mounting device 116, in accordance with one embodiment. Referring to FIG. 5E, pin 406 couples with one or more cushions 118 and 120 (illustrated in FIG. 3) and/or a vehicle frame (illustrated in FIG. 3). Pin 406 may be substantially cylindrical or a combination of shapes. An axis of pin 406 is substantially orthogonal to the planar surface of base 402. The axis of pin 406 also runs along the z-axis, similar to the axis of rod 312 (illustrated in FIG. 3). Pin 406 substantially prevents movement of rod 312 (illustrated in FIG. 3), and thus, shock absorber assembly 114 (illustrated in FIG. 3), in a rotational direction with respect to the z-axis and a lateral direction with respect to the vehicle body along the y-axis, when coupled to at least the vehicle frame. As previously described, pin 406 may be coupled to base 402 in various ways.

Pin 406 is made of a rigid material, such as carbon steel or other rigid material(s). In some embodiments, the rigid material may be chromate conversion coated or otherwise finished. As described above, pin 406 can be various sizes and shapes.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional or physical partitioning and configurations can be implemented to implement the desired features of the technology disclosed herein. Also, a multitude of different constituent module names other than those depicted herein can be applied to the various partitions.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A mounting device, comprising:
a base comprising a cavity adapted to receive a portion of a shock absorber assembly, wherein the base provides for movement of the shock absorber assembly relative to a vehicle body in at least one degree of freedom and substantially prevents movement of the shock absorber assembly relative to the vehicle body in at least another degree of freedom; and
a pin integrated with the base on a side distal from the cavity, wherein the pin is substantially parallel to an axis of the shock absorber assembly, wherein the pin is adapted to engagingly couple to one or more cushions and a vehicle frame, and
wherein the base comprises a shape memory material, such that deformation of the base provides for movement of the shock absorber assembly in the at least one degree of freedom.

2. The mounting device of claim 1, wherein the at least one degree of freedom comprises a first set of directions substantially orthogonal to the axis of the shock absorber assembly.

3. The mounting device of claim 2, wherein the at least another degree of freedom in which the movement of the shock absorber assembly is substantially prevented comprises a second set of directions that are substantially rotational with regards to the axis of the shock absorber assembly.

4. The mounting device of claim 2, wherein the at least another degree of freedom in which the movement of the shock absorber assembly is substantially prevented comprises a second set of directions substantially orthogonal to the axis of the shock absorber assembly and substantially orthogonal to the first set of directions.

5. The mounting device of claim 1, wherein the pin is tapered, such that a first portion of the pin has a larger diameter than a second portion of the pin.

6. A mounting device, comprising:
a base, comprising a cavity adapted to receive a portion of a rotatable member, wherein the base provides for movement of the rotatable member relative to a vehicle body in at least one degree of freedom and substantially prevents movement of the rotatable member relative to the vehicle body in at least another degree of freedom, wherein the base comprises a shape memory material, such that deformation of the base provides for movement of the rotatable member in the at least one degree of freedom; and
a pin integrated with the base on a side distal from the cavity, wherein the pin is substantially parallel to an axis of the rotatable member, wherein the pin is adapted to engagingly couple to one or more cushions and a vehicle frame by passing through the one or more cushions, and wherein the one or more cushions encircles or surrounds the pin.

7. A mounting device, comprising:
a base, comprising a cavity adapted to receive a portion of a rotatable member, wherein the base provides for movement of the rotatable member relative to a vehicle body in at least one degree of freedom and substantially prevents movement of the rotatable member relative to the vehicle body in at least another degree of freedom; and
a pin integrated with the base on a side distal from the cavity, wherein the pin is substantially parallel to an axis of the rotatable member, wherein the pin is adapted to engagingly couple to one or more cushions and a vehicle frame by passing through the one or more cushions, and wherein the one or more cushions encircles or surrounds the pin, wherein the at least one degree of freedom comprises a first set of directions substantially orthogonal to the axis of the rotatable member.

8. The mounting device of claim 7, wherein the at least another degree of freedom in which the movement of the rotatable member is substantially prevented comprises a third set of directions substantially orthogonal to the axis of the rotatable member and substantially orthogonal to the first set of directions.

* * * * *